M. WENGER.
Fork and Band Cutter.

No 106,758.  Patented Aug. 23, 1870.

WITNESSES:
N. F. Shaeffer
John D. Buckwalter

INVENTOR:
Milton Wenger

UNITED STATES PATENT OFFICE.

MILTON WENGER, OF UPPER LEACOCK P. O., PENNSYLVANIA.

IMPROVEMENT IN COMBINED FORK AND BAND-CUTTER.

Specification forming part of Letters Patent No. 106,758, dated August 23, 1870.

*To all whom it may concern:*

Be it known that I, MILTON WENGER, of Upper Leacock P. O., in the county of Lancaster and State of Pennsylvania, have invented a certain Combined Fork and Knife or Cutter for Handling and Cutting the Bands on Sheafs of Grain, of which the following is a specification.

The object of my invention is to save the extra labor of a hand with a knife for the purpose of cutting the straw bands encircling the sheaves of grain when laid on the table of a thrashing-machine—an operation which consumes considerable time—by means of a cutting-blade between a pair of forks to hold the severed band and sheaf, so that the taking up and depositing it upon the table gives the sheaves ready for feeding them to the cylinder, with the bands cut in handling the same.

The drawings show the construction of this implement and the application of the same.

Figure 1:
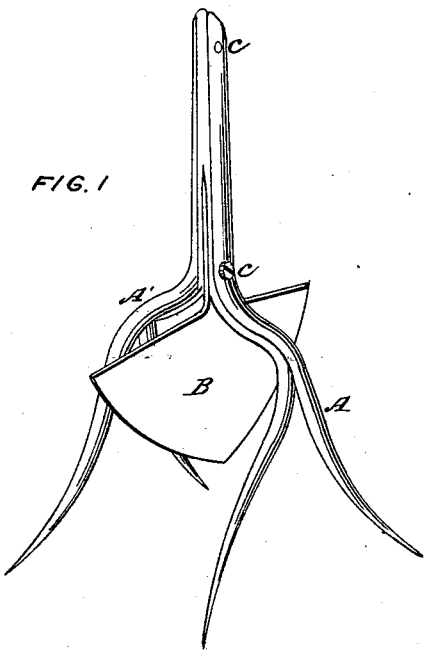

Figure 1 shows two ordinary forks, A A', united, with a slot between them for a knife or cutting-blade, B, which has a prolonged stem, which is perforated at intervals for a binding or set screw, C, by which means the knife B can be adjusted between the forks. The combined forks and intermediate blade is provided with a handle of any desired length and secured in the ordinary manner for handling the sheaves of grain.

Figure 2:
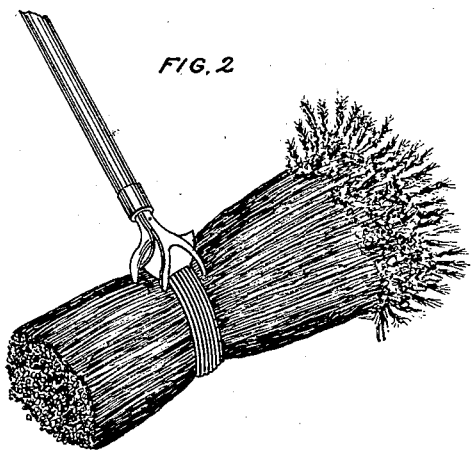

Fig. 2 illustrates the application of the implement by bringing the cutting-edges of the knife across the band, so as to sever the same while thrusting the fork into the sheaf, and so that the united forks hold the grain or straw in position for handling in conveying it to the table to the hand of the feeder of the machine while thrashing grain.

I am not aware that an implement of the kind for the purpose has yet been used. I do not, therefore, confine myself to the shape of the forks as shown, nor the precise construction of the knife or cutting blade, as I had several forms under consideration, and may see fit to modify their configuration as experience may dictate.

What I claim as my invention, and desire to secure by Letters Patent, is—

The combination of two forks, A A', with a cutting-blade, B, between them, made adjustable by a screw, C, substantially in the manner and for the purpose specified.

MILTON WENGER.

Witnesses:
N. F. SHAEFFER,
JOHN D. BUCKWALTER.